(12) United States Patent
Ansari et al.

(10) Patent No.: US 9,086,500 B2
(45) Date of Patent: Jul. 21, 2015

(54) APPARATUS AND METHOD FOR PULSED NEUTRON MEASUREMENT

(75) Inventors: Rafay Z. Ansari, Houston, TX (US); Feyzi Inanc, Spring, TX (US); Elton Frost, Jr., Spring, TX (US); David M. Chace, Houston, TX (US); W. Allen Gilchrist, Jr., Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 496 days.

(21) Appl. No.: 12/984,312

(22) Filed: Jan. 4, 2011

(65) Prior Publication Data

US 2012/0010819 A1 Jan. 12, 2012

Related U.S. Application Data

(60) Provisional application No. 61/293,290, filed on Jan. 8, 2010.

(51) Int. Cl.
*G01V 5/04* (2006.01)
*G01V 5/10* (2006.01)

(52) U.S. Cl.
CPC . *G01V 5/101* (2013.01); *G01V 5/10* (2013.01)

(58) Field of Classification Search
CPC ........... G01V 5/10; G01V 5/101; G06F 19/00
USPC .......... 702/2, 8, 28.4, 168, 9; 166/249, 254.1, 166/376, 254.2, 66.6; 250/254, 255, 263, 250/264, 269.3, 269.4, 265, 266
See application file for complete search history.

(56) References Cited

U.S. PATENT DOCUMENTS

| | | | |
|---|---|---|---|
| 3,139,528 A | | 6/1964 | Frank |
| 3,930,153 A | * | 12/1975 | Scott ............................. 376/160 |
| 4,903,527 A | * | 2/1990 | Herron ....................... 73/152.05 |
| 6,493,632 B1 | | 12/2002 | Mollison et al. |
| 6,665,616 B2 | * | 12/2003 | Mickael ............................ 702/8 |
| 6,944,548 B2 | * | 9/2005 | Radtke et al. ..................... 702/8 |
| 6,944,549 B2 | * | 9/2005 | McClure ......................... 702/22 |
| 7,000,700 B2 | * | 2/2006 | Cairns et al. ................ 166/255.2 |
| 7,117,092 B2 | * | 10/2006 | Jacobson .......................... 702/8 |
| 7,365,308 B2 | * | 4/2008 | Trcka et al. ................. 250/269.6 |
| 7,490,028 B2 | * | 2/2009 | Sayers et al. .................... 703/10 |
| 7,880,134 B2 | * | 2/2011 | Kirkwood et al. ......... 250/269.6 |

(Continued)

FOREIGN PATENT DOCUMENTS

WO 2009112914 A3 11/2009

OTHER PUBLICATIONS

Ansari, et al. "Field Applications of a New Cased Hole gas Saturation measurement in Tight Gas Reservoirs". SPWLA 50th Annual Logging Symposium, Jun. 21-24, 2009. pp. 1-9.

(Continued)

*Primary Examiner* — Michael Nghiem
*Assistant Examiner* — Eman Alkafawi
(74) *Attorney, Agent, or Firm* — Cantor Colburn LLP

(57) ABSTRACT

A method of estimating at least one property of an earth formation includes: constructing a matrix model of a formation; constructing a shale model of the formation, the shale model including an estimation of a concentration of at least one trace element; combining the first model and the second model to generate a formation model; and comparing measured pulsed neutron data with the mixed model to estimate the at least one property.

20 Claims, 18 Drawing Sheets

(56) References Cited

U.S. PATENT DOCUMENTS

| | | |
|---|---|---|
| 2004/0222368 A1 | 11/2004 | Odom et al. |
| 2007/0246649 A1* | 10/2007 | Jacobi et al. ............... 250/269.6 |
| 2008/0023629 A1* | 1/2008 | Herron et al. ............... 250/269.6 |
| 2009/0026359 A1 | 1/2009 | Stephenson et al. |
| 2009/0114807 A1* | 5/2009 | Kirkwood et al. ......... 250/269.7 |
| 2009/0210161 A1* | 8/2009 | Duenckel et al. ................. 702/8 |
| 2010/0089572 A1* | 4/2010 | Chang et al. ............... 166/255.2 |
| 2010/0327154 A1* | 12/2010 | Vaeth et al. ............... 250/269.6 |

OTHER PUBLICATIONS

Inanc, et al. "Physical Basis, Modeling, and Interpretation of a New Gas Saturation Measurement for Cased Wells". SPWLA 50th Annual Logging Symposium, Jun. 21-24, 2009. pp. 1-14.

Notification of Transmittal of the International Search Report and the Written Opinion of the International Searching Authority, or the Declaration; PCT/US2011/020347; Apr. 28, 2015, 10 pages.

* cited by examiner

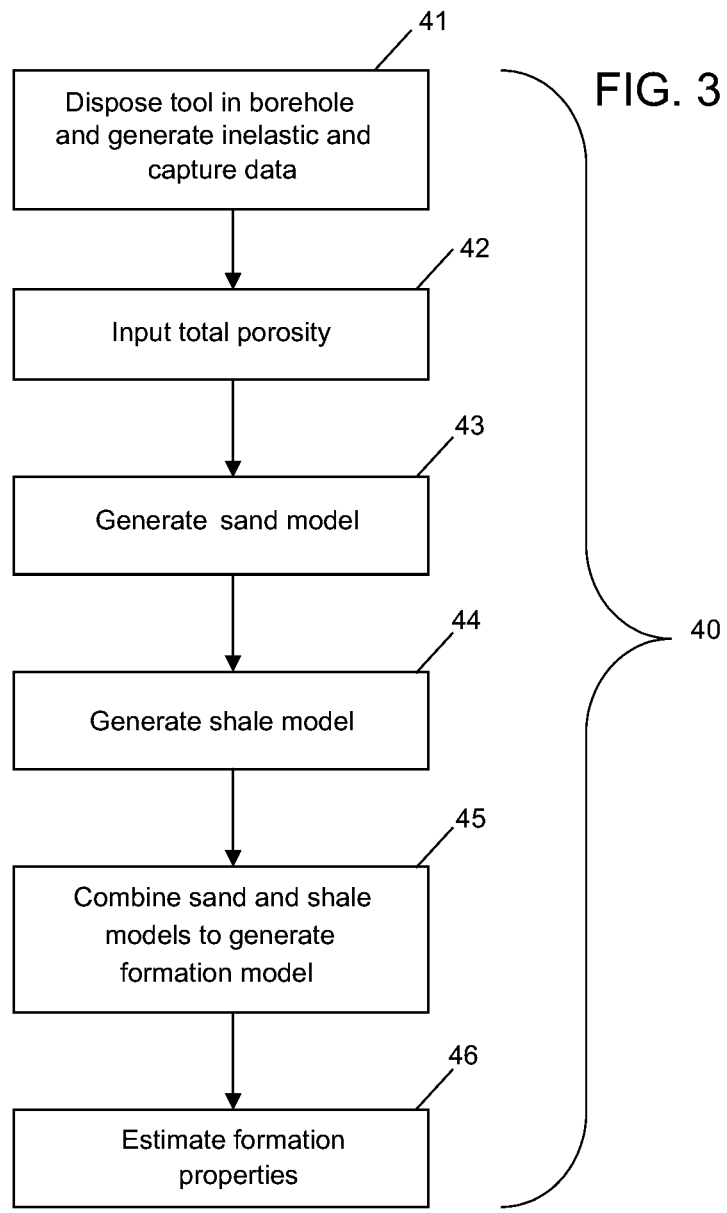

RIN13 / RATO13
Measured Data vs. Modeling Results
Traditional Method: Effective Porosity

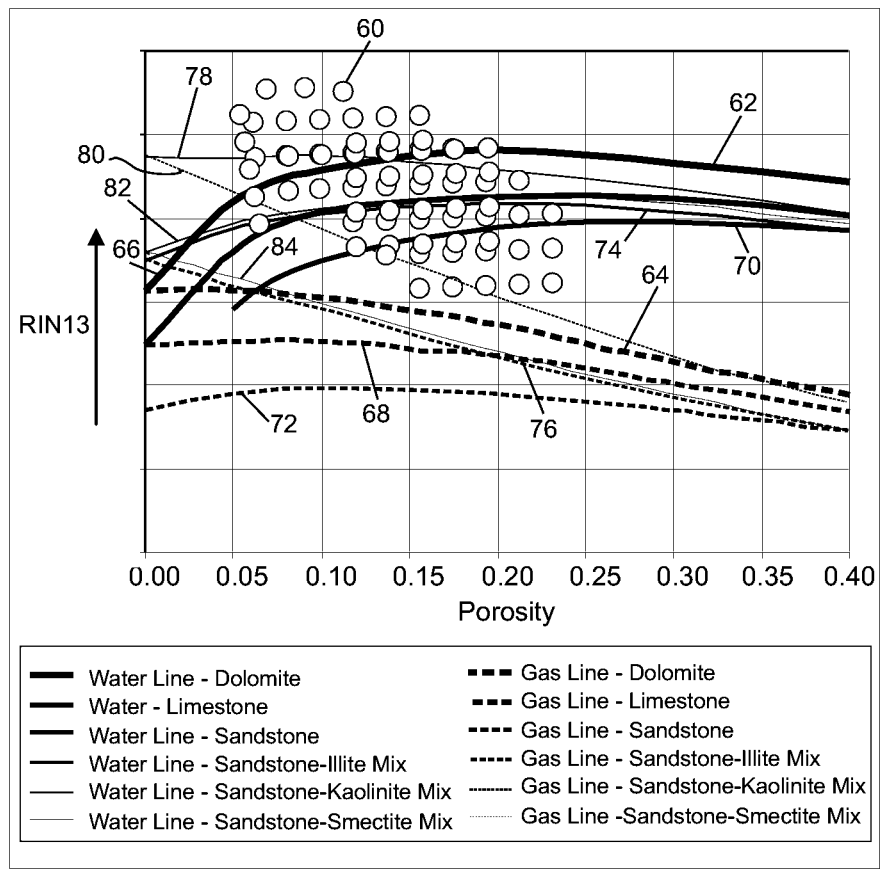

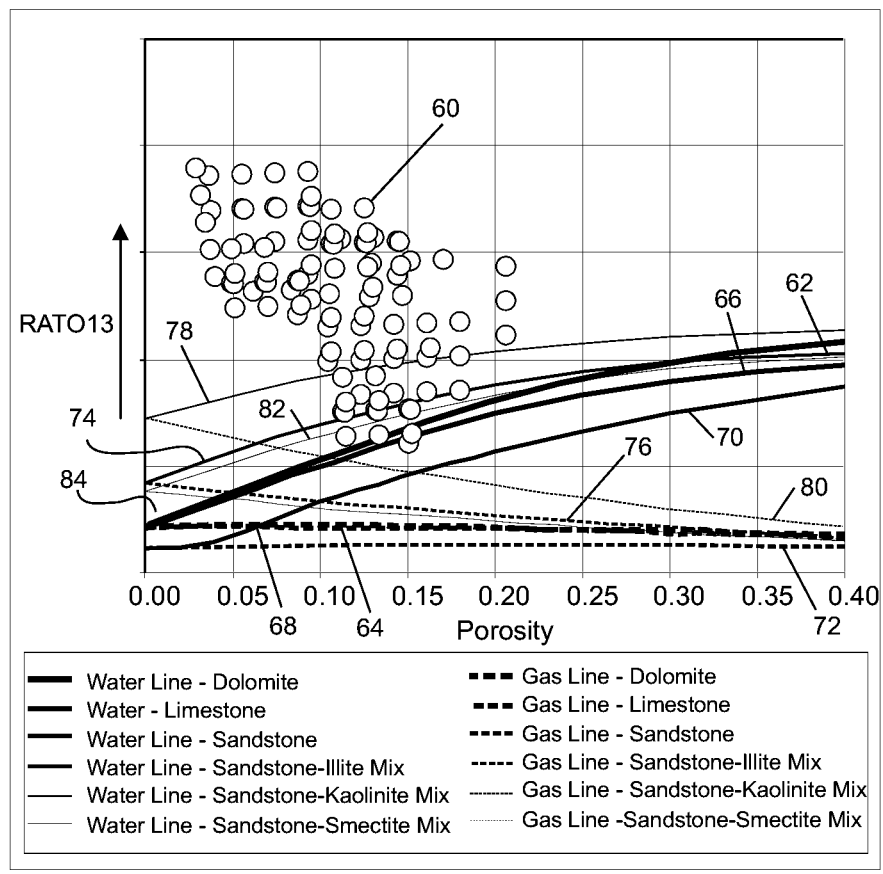

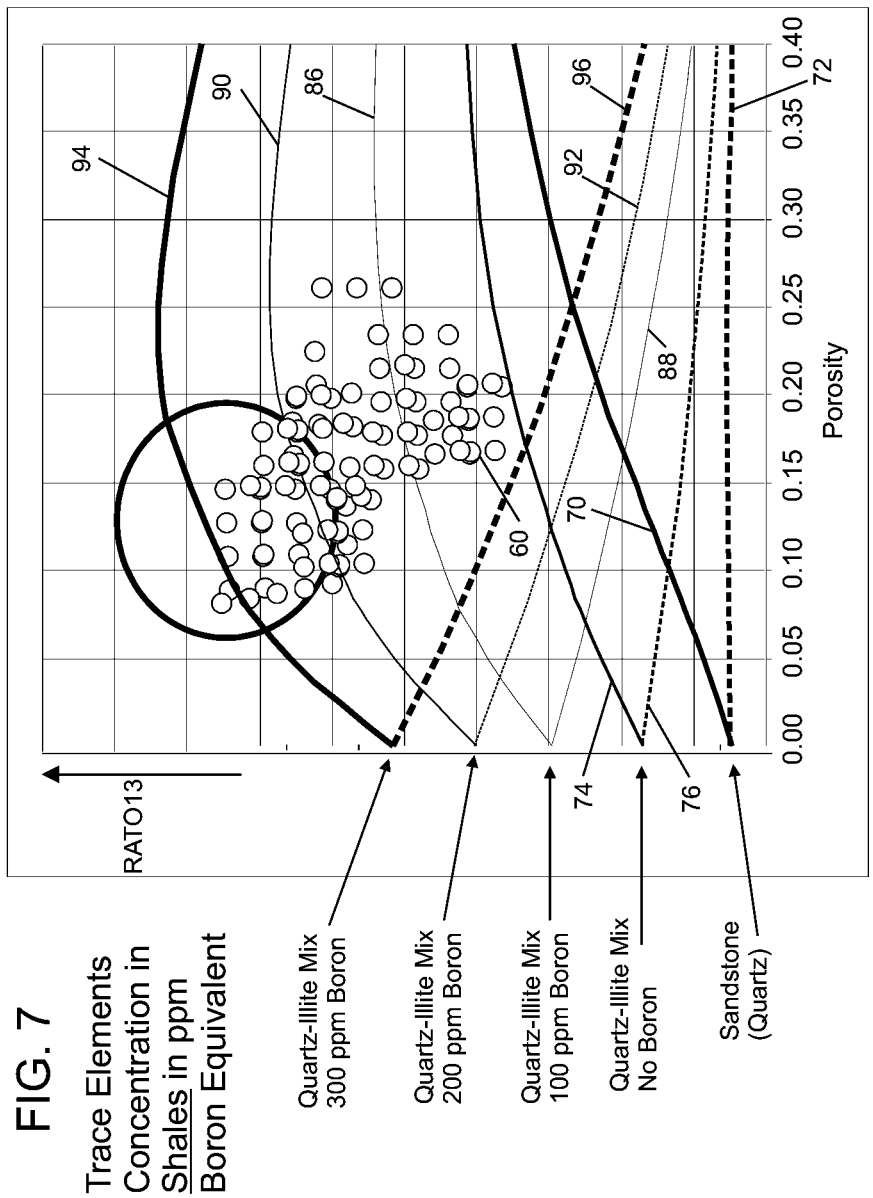

Sigma in Shales corresponds to
50% Quartz, 50% Illite Mix with 300 ppm Boron

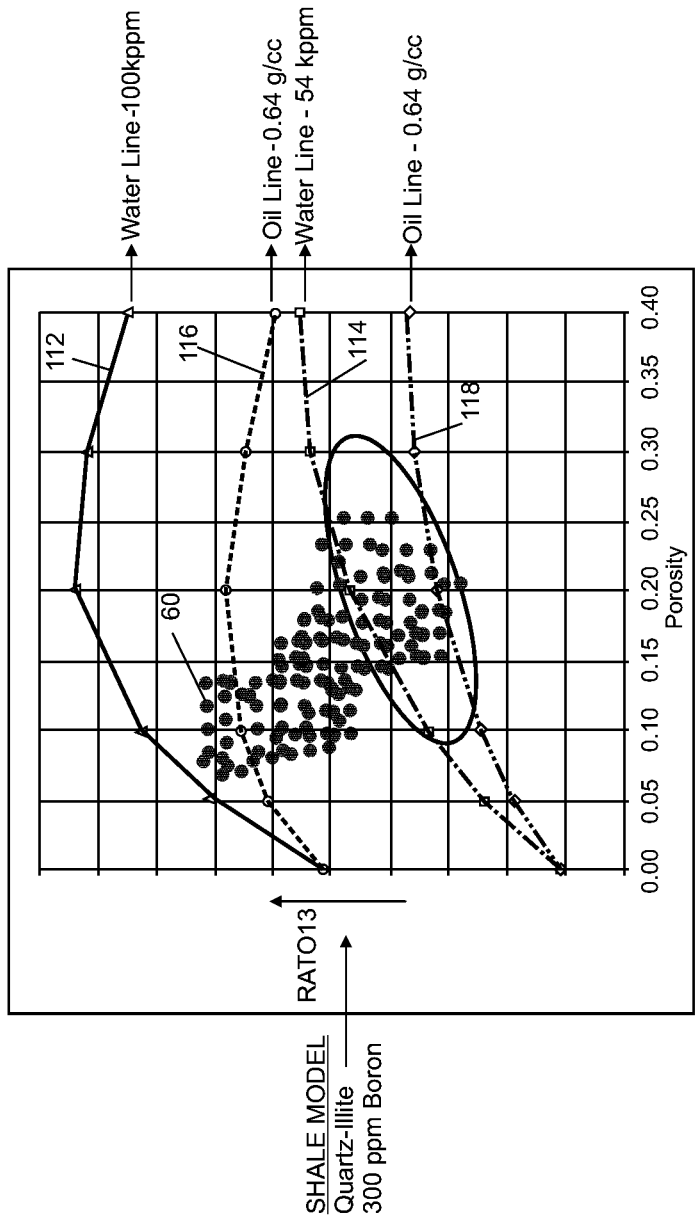

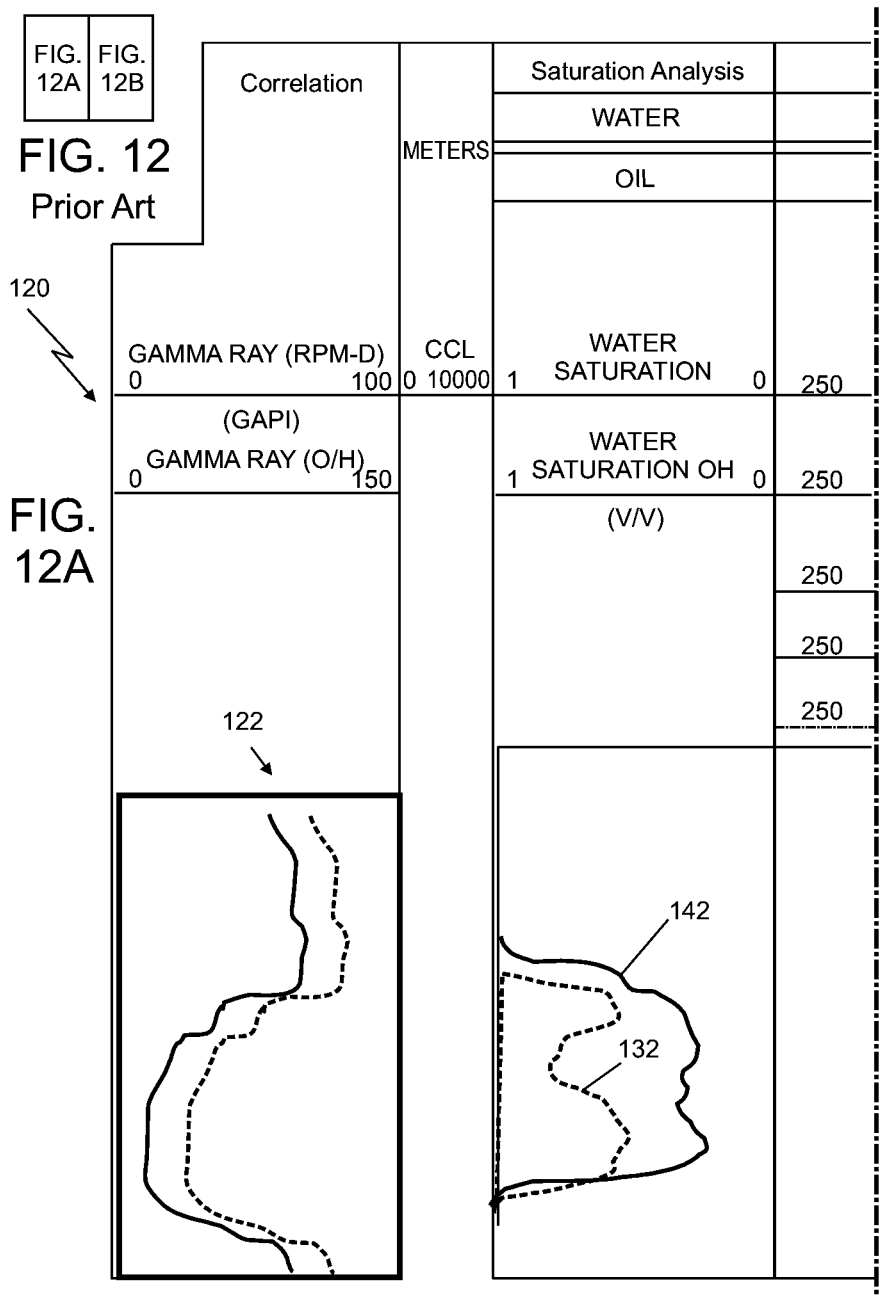

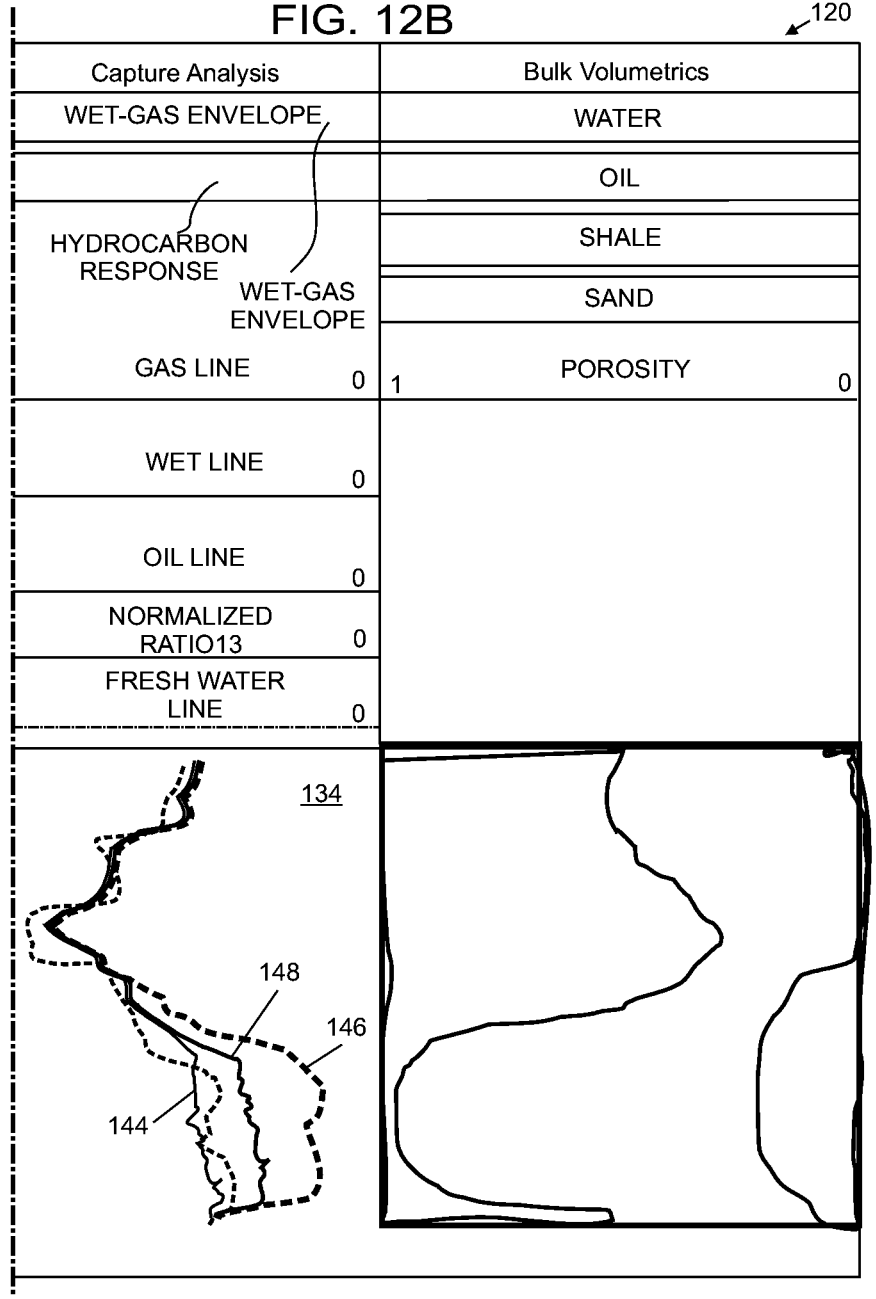

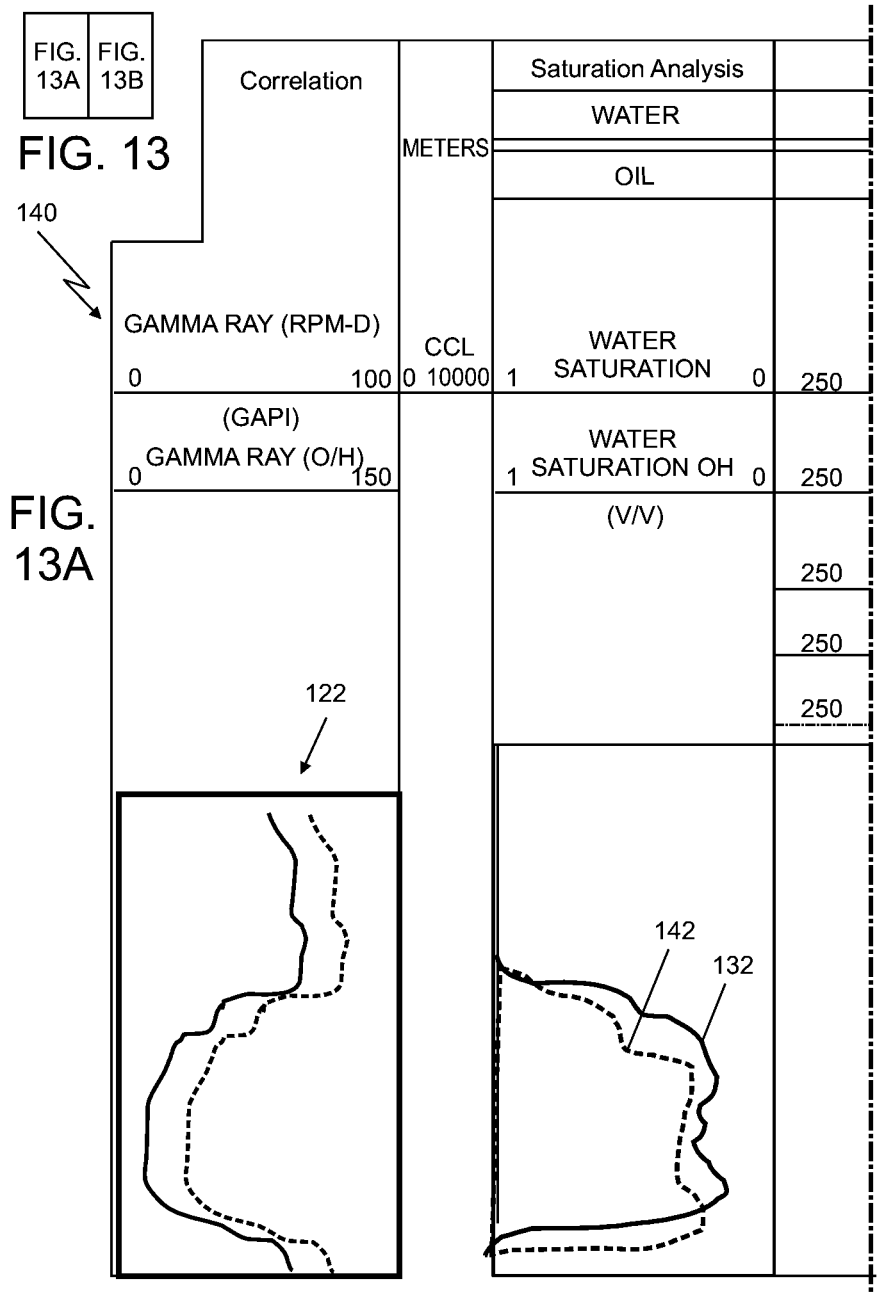

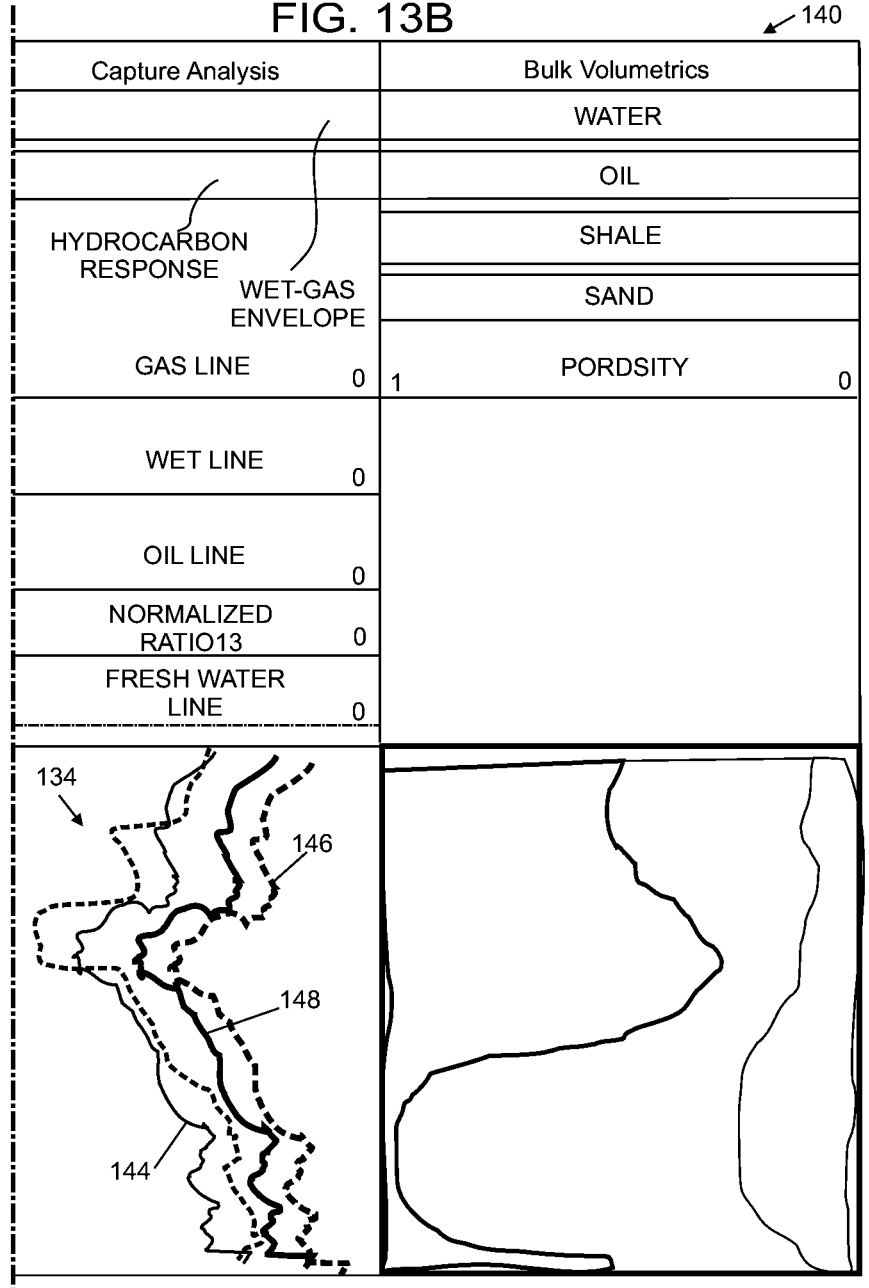

APPARATUS AND METHOD FOR PULSED NEUTRON MEASUREMENT

CROSS REFERENCE TO RELATED APPLICATIONS

This application claims the benefit of an earlier filing date from U.S. Provisional Application Ser. No. 61/293,290 filed Jan. 8, 2010, the entire disclosure of which is incorporated herein by reference.

BACKGROUND

Pulsed neutron sources are useful in a variety of applications, such as subterranean operations. Examples of subterranean operations include processes for evaluating subterranean formations. Pulsed neutron spectroscopy involves bombarding a formation with high-energy neutrons and measuring the spectrum of gamma rays emitted by the formation. Different nuclei in formation materials emit characteristic gamma rays, allowing for the estimation of formation constituents and properties such as porosity and oil/gas saturation.

Saturation calculation in some types of formations, such as shaly formations, using pulsed neutron instruments has always been challenging because of the issue of shale handling. For example, pulsed neutron log analysis in shaly sands is complicated because minor variations in shale volume can have a large impact on measurements. Such variations can thus significantly compromise the accuracy of pulsed neutron measurements and the corresponding analysis. Historically, an easier treatment has been to use effective porosity and an in-situ wet shale value for log analysis. For example, conventional techniques such as sigma and C/O (carbon/oxygen) techniques have used the log response in shales as a matrix or calibration value for analysis purposes. However, such techniques can suffer because of data limitation since effective porosity is often not available and shale characteristics can change from zone to zone.

SUMMARY

A method of estimating at least one property of an earth formation includes: constructing a matrix model of a formation; constructing a shale model of the formation, the shale model including an estimation of a concentration of at least one trace element; combining the first model and the second model to generate a formation model; and comparing measured pulsed neutron data with the mixed model to estimate the at least one property.

An apparatus for estimating at least one property of an earth formation includes: a carrier configured to be disposed in the formation; a neutron source disposed at the carrier and configured to irradiate the formation with neutrons; at least one detector disposed at the carrier and configured to measure gamma rays emitted by the formation and generate gamma ray measurement data; and a processor in communication with the at least one detector to receive the gamma ray measurement data. The processor is configured to: construct a matrix model of a formation; construct a shale model of the formation, the shale model including an estimation of a concentration of at least one trace element; combine the matrix model and the shale model to generate a formation model; and compare the gamma ray measurement data with the formation model to estimate the at least one property.

DETAILED DESCRIPTION

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3 is a flow chart providing an exemplary method of generating a formation model and/or analyzing downhole tool measurements;

FIGS. 6A and 6B are exemplary plots of measured data and a plurality of shale models;

FIG. 7 is an exemplary plot of the measured data of FIG. 6B and a plurality of shale models including selected concentrations of trace elements;

FIG. 11 is an exemplary plot of the measured data of FIG. 6B and selected matrix and shale models including trace elements;

FIGS. 12A and 12B (Collectively referred to as FIG. 12) is an illustration of a prior art well log generated using prior art models; and FIGS. 13A and 13B (Collectively referred to as FIG. 13). is an illustration of an exemplary well log generated using the models of FIG. 11.

DETAILED DESCRIPTION

Apparatuses and methods for characterizing subterranean formations are described herein. The apparatuses and methods include the generation of models using various measurement data, such as pulsed neutron tool data. The models characterize both sand/matrix regions and shale regions as a representative mix of different minerals, which may also include estimations of trace elements. The models are generated using selected techniques such as Monte Carlo based modeling or other algorithms, simulations and models. The apparatuses and methods use a multi-model code to mix the representative sand/matrix and shale models according to their respective volumes to obtain measurement results such as saturation and concentrations of formation constituents.

Figure 1:
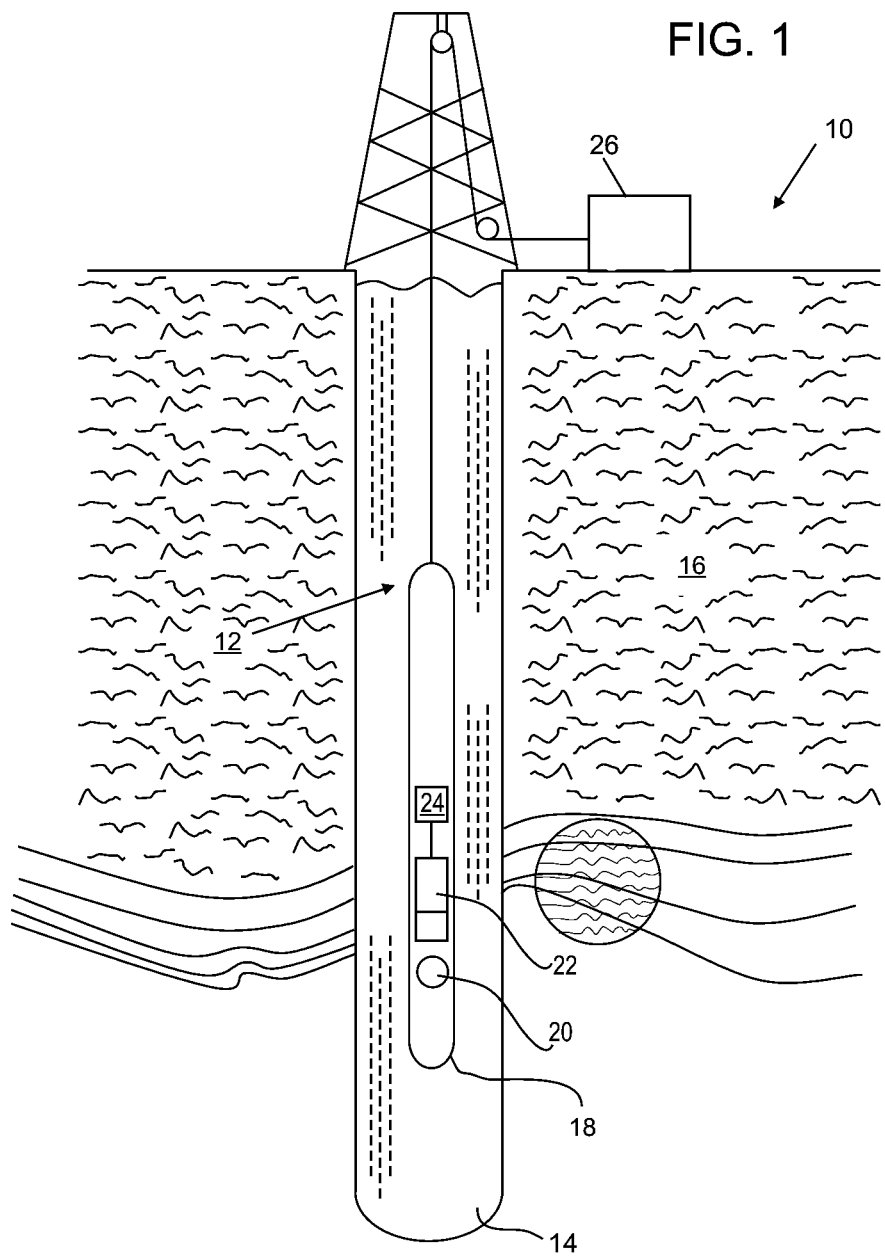
FIG. 1 is a side cross-sectional view of an embodiment of a subterranean well drilling, evaluation, exploration and/or production system.

Referring to FIG. 1, an exemplary embodiment of a subterranean well drilling, evaluation, exploration and/or production system 10 includes a borehole string 12 that is shown disposed in a borehole 14 that penetrates at least one earth formation 16 during a subterranean operation. In one embodiment, the borehole 14 is a cased borehole. In one embodiment, the borehole string includes a downhole tool 18 such as a well logging tool. In this example, the downhole tool 18 is a wireline tool, but is not limited thereto. For example, the downhole tool 18 can be incorporated with a drill string for logging-while-drilling (LWD) applications, such as when the borehole 14 is not completed with a casing. The downhole tool 18 is not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

As described herein, "formations" refer to the various features and materials that may be encountered in a subsurface environment and surround the borehole. Formations include various constituents such as sand, shale, coal, carbonates, and evaporites. The constituents include various minerals such as sandstone, quartz, potassium-feldspar, albite, calcite, dolomite, siderite, anhydrite, illite/smectite, kaolinite, glauconite, chlorite, pyrite, and others. Formations typically include dominant matrix materials in which hydrocarbon reservoirs are retained, referred to herein as "sand" or "matrix" materials. Sand materials generally include sand grain sized particles held together by silicates and/or other minerals. Examples of sand materials include one or more of sandstone, quartz, limestone and dolomite. Matrix materials may include both sand materials as well as various other minerals and materials. In addition, formations typically include shale, a sedimentary or other rock material composed of clays and other minerals, and generally having small (e.g., nanometer) pore sizes. Matrix materials, sand and shale can include various trace elements, such as boron, gadolinium and samarium. Trace elements, in one embodiment, include elements in the sand and/or shale materials that have a high thermal neutron capture cross-section.

The downhole tool 18, in one embodiment, is configured as a pulsed neutron tool. The tool 18 includes, for example, at least one pulsed neutron source 20 and at least one gamma ray detector 22. In one embodiment, electronics 24 are also included for storing, transmitting and/or processing signals and/or data generated by the gamma ray detector 22. The number of pulsed neutron sources 20 and gamma ray detectors 22 is not limited. In one embodiment, at least one gamma ray detector 22 is configured to detect the presence of gamma rays and gamma ray attributes. Gamma ray detectors are generally capable of generating signals and/or data representative of both inelastic and capture gamma rays.

The tool 18, in addition to including a pulsed neutron tool, may include or otherwise be utilized in conjunction with any number of additional measurement tools such as nuclear magnetic resonance (NMR) tools, nuclear quadrapole resonance (NQR) tools, resistivity tools, seismic tools, porosity sensors and others. In one embodiment, the tool 18 is equipped with transmission equipment to communicate ultimately to a surface processing unit 26. Such transmission equipment may take any desired form, and different transmission media and methods may be used. Examples of connections include wired, fiber optic, wireless connections and memory based systems.

Figure 2:
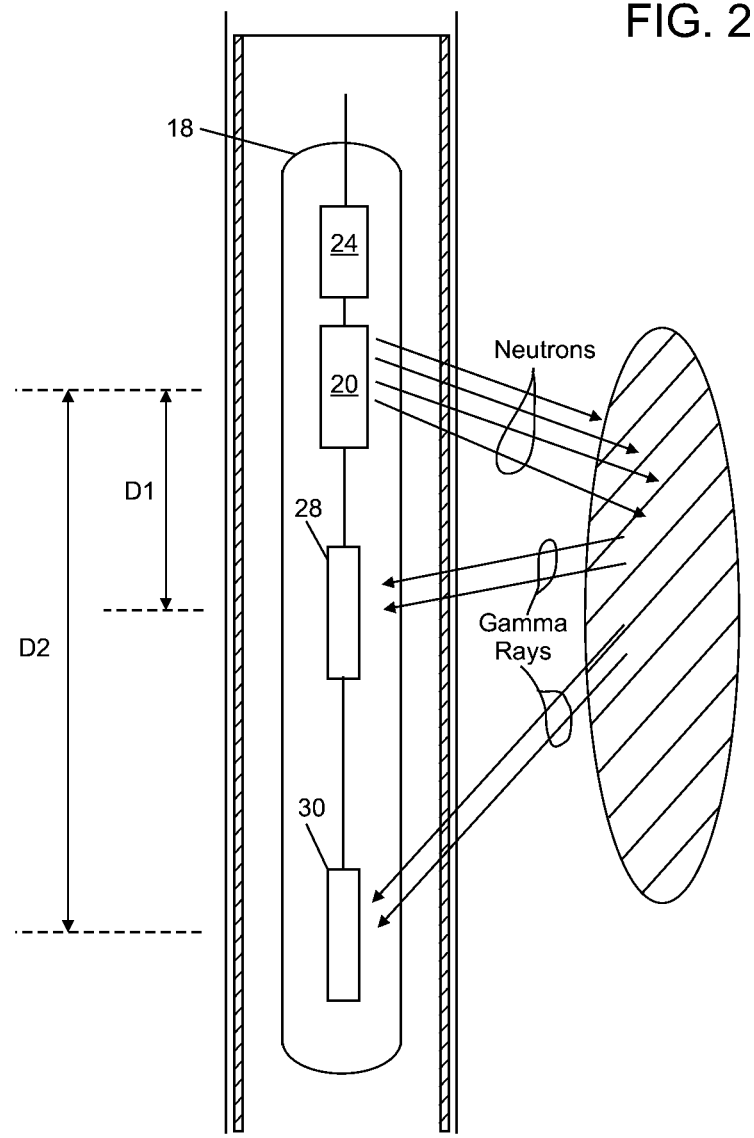
FIG. 2 is a side view of an embodiment of a downhole tool for measuring characteristics and composition of a borehole and/or an earth formation.

Referring to FIG. 2, an exemplary embodiment of the tool 18 includes the pulsed neutron source 20 and one or more gamma ray detectors 22 coupled to the electronics 24. Two of the main interaction mechanisms that are detected by the detectors 22, among others, are neutron capture and neutron inelastic scattering which can generate neutron-induced gamma rays.

In one embodiment, the gamma ray detectors 22 include a first detector 28 spaced a first distance (D1) from the neutron source 20. The first detector 28 is configured to detect gamma rays as photons emitted by the formation 16 as a result of irradiation with the neutrons emitted from the neutron source 20. Detecting photons includes counting the photons, measuring the energy of each detected photon, and/or measuring the time of detection with respect to the time of the neutron pulse. Thus, the first detector 28 can acquire data that can be used to provide a time spectrum and/or an energy spectrum.

A second detector 30 is spaced a second distance (D2) from the neutron source 20. The second detector 30 is similar to the first detector 28 with respect to detecting photons emitted by the formations 16. In one embodiment, the second distance D2 is greater than the first distance D1. The first detector 28 closest to the neutron source 20 is referred to as a short spaced (SS) detector 28 and the second detector 30 furthest from the neutron source 20 is referred to as an extra long spaced (XLS) detector 30. In some embodiments, at least one additional detector, such as a long spaced (LS) detector, is positioned between the SS detector 28 and the XLS detector 30.

A variety of indicators can be utilized to facilitate analysis of the gamma ray data. For example, various indicators are used to analyze gamma ray detection data from the tool to facilitate estimation of various formation properties. An exemplary indicator is a "RIN13" indicator, which is the ratio of photons from fast neutron inelastic scattering interactions detected by the SS detector 28 to the photons from inelastic scattering interactions detected by the XLS detector 30. Another exemplary indicator is a "RATO13" indicator, which is the ratio of photons from thermal neutron capture interactions detected by the SS detector 28 to the capture photons detected by the XLS detector 30.

FIG. 3 illustrates a method 40 of estimating at least one property of an earth formation. The method 40 may be performed in conjunction with the system 10 and/or the downhole tool 18, but is not limited thereto. The method 40 may be used in conjunction with any apparatus or configuration capable of taking pulsed neutron measurements. The method 40 includes one or more stages 41-46. In one embodiment, the method 40 includes the execution of all of the stages 41-46 in the order described. However, certain stages may be omitted, stages may be added, or the order of the stages changed.

In the first stage 41, the pulsed neutron tool 18 is disposed in the borehole 16, and one or more measurements are taken. The borehole 16 may be a cased borehole or an open borehole. Measurements are taken by activating the neutron source 30 and detecting resultant gamma ray photons. In one embodiment, one or more measurements are taken for each of a plurality of borehole depths.

In one embodiment, the taking of measurements from the tool 18 is recorded in relation to the depth and/or position of the tool 18, which is referred to as "logging", and a record of such measurements is referred to as a "log". Examples of logging processes that can be performed by the system 10 and in conjunction with the methods described herein include measurement-while-drilling (MWD) and logging-while-drilling (LWD) processes. Additional examples of logging processes include logging measurements after drilling, wireline logging, pipe-conveyed logging operations, drop shot logging and memory logging. The data retrieved during these processes may be transmitted to the surface, and may also be stored with the downhole tool for later retrieval.

In the second stage 42, the total porosity of the formation at each data point is estimated. Porosity can be estimated by any suitable method, including methods using open hole logs and neutron based measurements.

In the third stage 43, a model of the shale region of the formation ("shale model") is generated. In one embodiment, the shale model is generated by generating and/or selecting a number of hypothetical shale models. Each of the hypothetical shale models include varying mixes of constituents such as sand minerals, clay minerals and trace elements. Measurement data is then compared to each of the hypothetical shale models to determine the most appropriate or closest shale model. In one embodiment, the concentration of trace elements in the model is estimated based on sigma values calculated from the measurement data.

In the fourth stage 44, a model of the sand or matrix region of the formation ("matrix model") is generated. In one embodiment, the matrix model is generated by generating and/or selecting a number of hypothetical matrix models. The matrix model is selected based on comparison of a number of hypothetical matrix models (including varying amounts of sand and/or other matrix materials and trace elements) with measurement data.

In the fifth stage 45, a model of the formation ("formation model") is generated. The selected matrix and shale models are mixed or otherwise combined to yield the formation model, as per the relative volumes of matrix and shale. For example, the matrix model and the shale model are combined as per their relative volumes to generate a final formation model. Optionally, the matrix, shale and/or formation models are adjusted based on known and/or measured quantities, such as salinity.

In one embodiment, the matrix, shale and formation models are generated using the total porosity measurements of the formation of stage 42. The models are built based on, for example, information regarding the borehole and downhole tool configurations, and estimations of the formation makeup including the matrix and shale, as well as trace elements.

The calculations used to construct the models can be performed via deterministic methods (e.g., the Boltzman transport equation) or simulations such as Monte Carlo based modeling. In one embodiment, the models are Monte Carlo numerical models designed to predict expected measurement values. The models may include geometrical descriptions of tool and completion geometry, borehole fluids, and formation minerals and fluids.

In the sixth stage 46, the formation model is utilized to estimate various properties of the formation in conjunction with the measured data. By comparing the measured data versus expected data generated as part of the formation model, properties of the formation can be estimated. For example, using the model and total porosity, as well as the pulsed neutron data, water, oil and/or gas saturation is estimated.

FIGS. 4 and 5 illustrate a comparison between models generated using prior art techniques and models generated by the method 40 described herein. This comparison demonstrates the advantage of formation models based on total porosity, as described herein, relative to prior art models based on effective porosity.

Figure 4A:
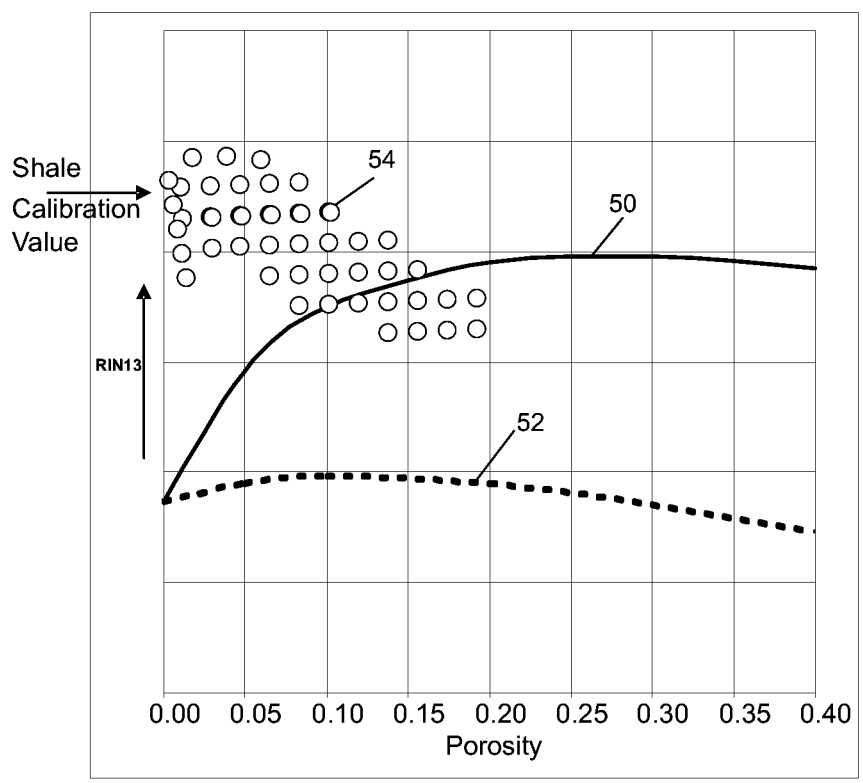
FIGS. 4A and 4B are exemplary prior art plots of measured data and a sandstone model using effective porosity.
Figure 4B:
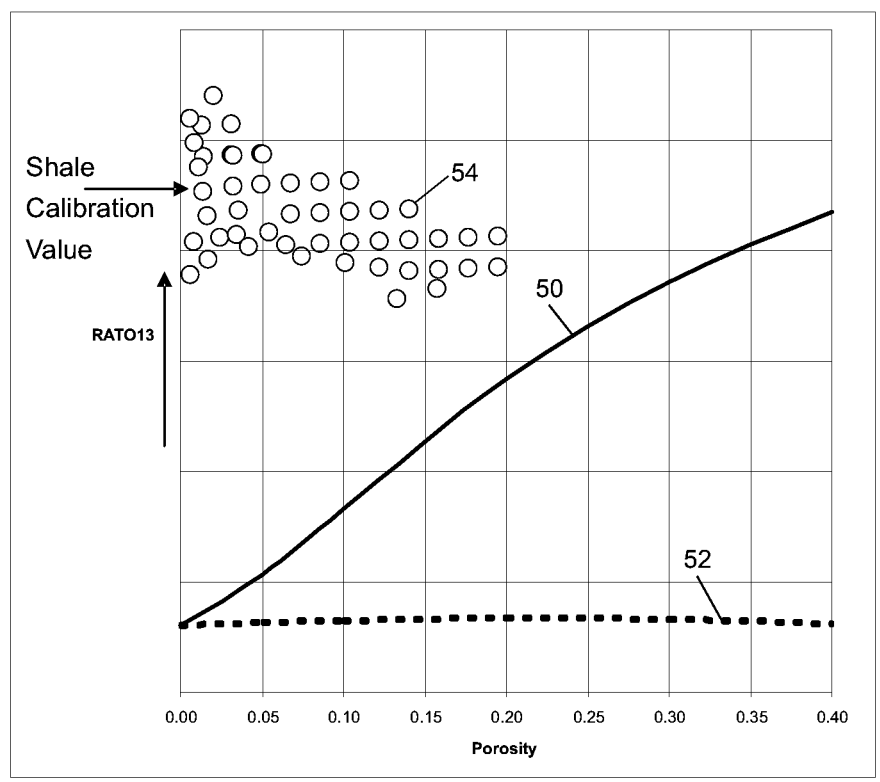

FIGS. 4A and 4B illustrate RIN13 and RATO13 plots, respectively, relative to effective porosity as practiced in the prior art. In this example, a model of a pure quartz sandstone is shown, represented by water line curves 50 and gas line curves 52. In general, the curves represent expected measurement values, such as RIN13 and RATO13 values, for various constituents of the formation, relative to porosity. For example, a water line represents the expected measurement values for water in a formation and borehole having specific properties.

The curves for liquid and gas for a selected sandstone model are shown, which in this example is assumed to be a pure quartz sandstone formation. FIGS. 4A and 4B demonstrate measured RIN13 and RATO13 data 54 for a sandstone formation relative to effective porosity. As shown, the measured data 54 does not correlate well with the model 50, 52. For example, the measured data 54 trends toward zero while the water line 50 trends upward.

Figure 5A:
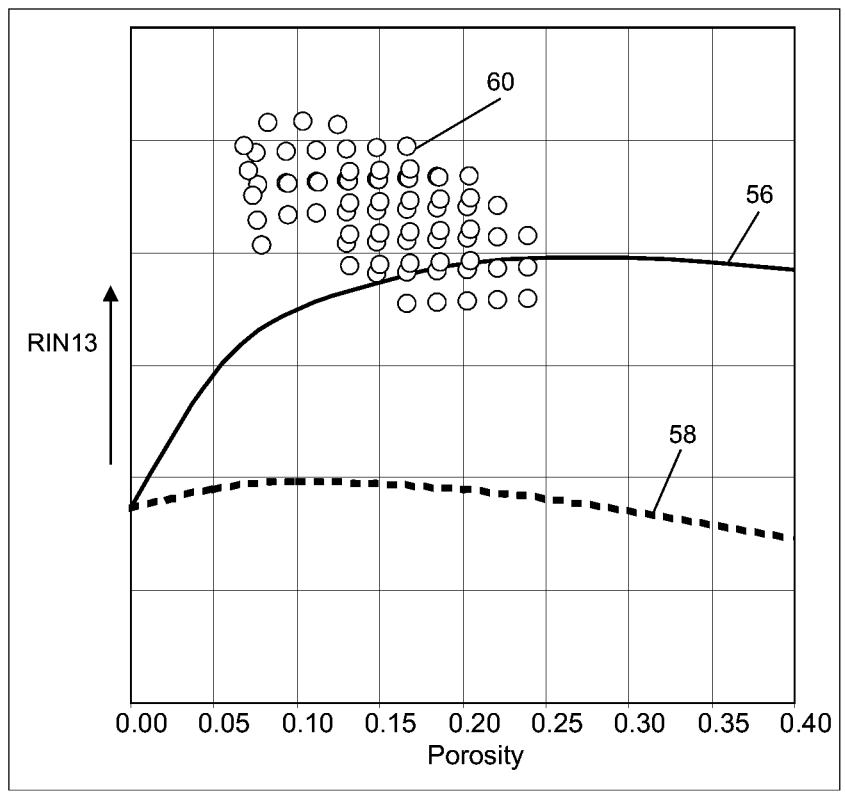
FIGS. 5A and 5B are exemplary plots of measured data and a sandstone model using total porosity.
Figure 5B:
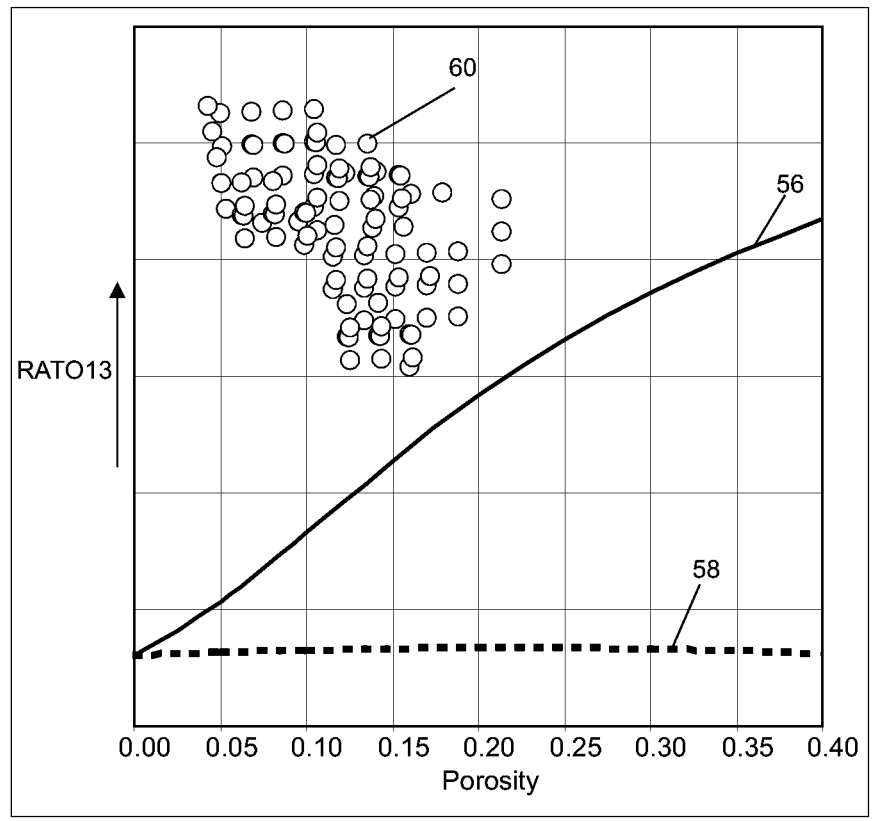

FIGS. 5A and 5B, on the other hand, show RIN13 and RATO13 plots, respectively, relative to total porosity. A model for pure quartz sandstone is represented by liquid lines 56 and gas lines 58.

Figure 8:
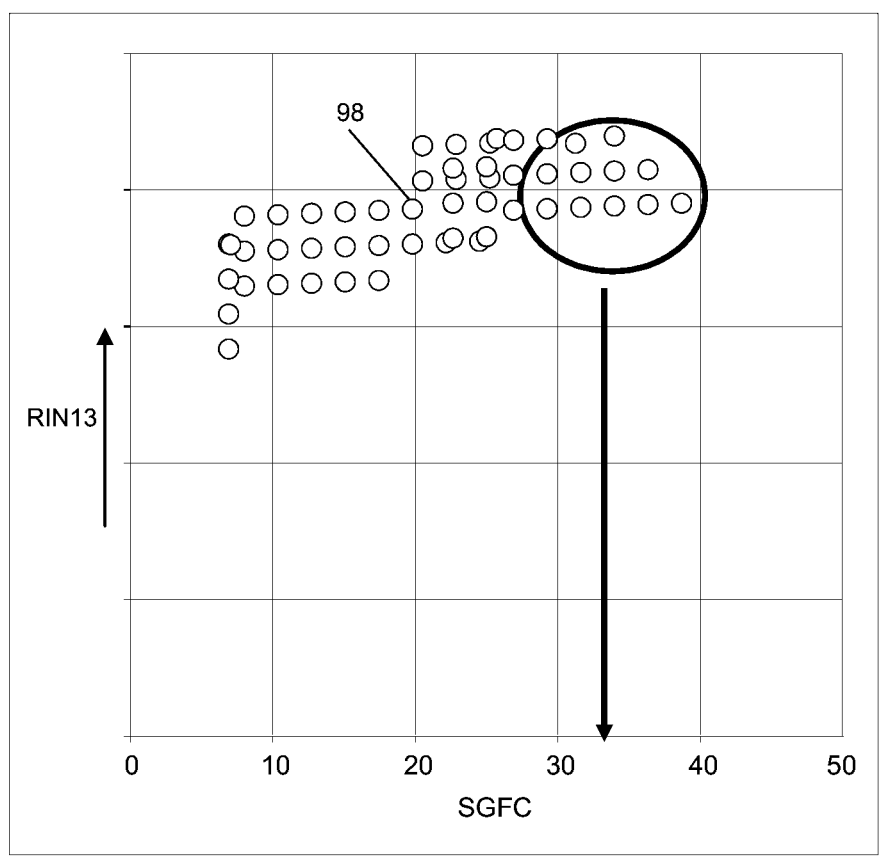
FIG. 8 is an exemplary plot showing measured sigma values.
Figure 9:
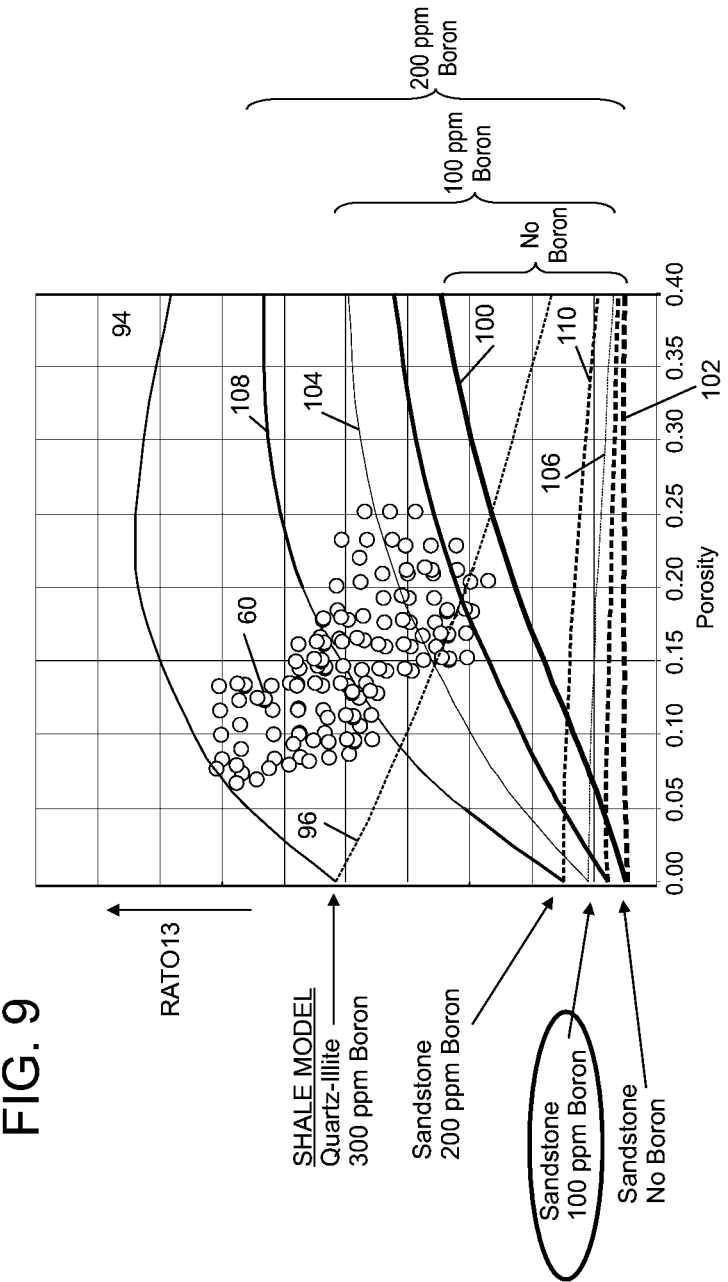
FIG. 9 is an exemplary plot of the measured data of FIG. 6B and a plurality of matrix models including selected concentrations of trace minerals.
Figure 10:
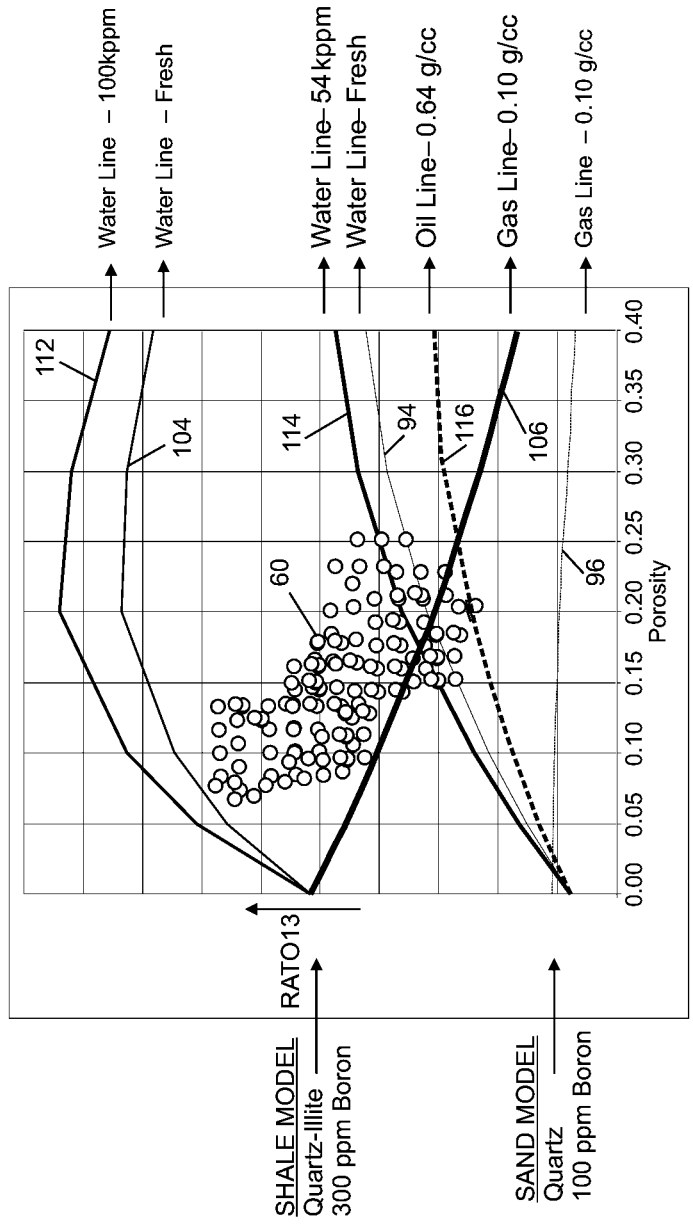
FIG. 10 is an exemplary plot of the measured data of FIG. 6B, as well as selected matrix and shale models that include salinity data.

FIGS. 6A, 6B and 7-11 illustrate an example of the method 40, using RIN13 and RATO13 plots of hypothetical and selected models, as well as measurement data based on measurements of a borehole and a surrounding formation taken by a pulsed neutron tool. FIGS. 6A, 6B, 7 and 8 illustrate the selection or generation of a shale model for a shale region of a formation. FIG. 9 illustrates the selection or generation of a matrix model for a matrix region of the formation. FIG. 10 illustrates the adjustment of the shale and matrix models based on fluid properties. FIG. 11 illustrates the completed formation model.

The example shown in FIGS. 6A, 6B and 7-11 represents the generation of a formation model to accurately describe an exemplary formation that includes 50% quartz and 50% clay. The models described herein are illustrative of the exemplary borehole and measurements, and are thus not limited to the types of formations or formation properties described herein. The models are described based on selected parameters such as matrix and shale constituent concentrations. The models may also be generated or selected using additional known and/or measured information, such as known formation constituents, borehole and downhole tool sizes and configurations, as well as borehole fluids, casing materials and downhole tool materials.

In one embodiment, each model described herein is represented by a number of data points, each representing a pulsed neutron measurement at a selected borehole depth plotted against the total porosity of the surrounding formation at that depth. The measurements in this example are represented by measured data points 60. The model data points and the measured data points represent either a RIN13 or a RATO13 ratio of data from the SS and XLS sensors. The measured data points 60 are not limited to RIN13 or RATO13 values, and may represent any suitable values based on gamma ray photons detected in the course of pulsed neutron measurements.

Referring to FIGS. 6A and 6B, a number of examples of hypothetical shale models are shown. In this example, multiple hypothetical shale models are generated or selected. These models include a water line 62 and a gas line 64 for pure dolomite, a water line 66 and gas line 68 for pure limestone, a water line 70 and gas line 72 for pure sandstone, a water line 74 and gas line 76 for a mix of 50% sandstone and 50% illite (sandstone-illite mix), a water line 78 and gas line 80 for a mix of 50% sandstone and 50% kaolinite (sandstone-kaolinite mix), and a water line 82 and gas line 84 for a mix of 50% sandstone and 50% smectite (sandstone-smectite mix).

The measured data points 60 are plotted with theoretical models to determine the closest hypothetical shale model. In this example, the sandstone-illite model 74, 76 is selected as having the closest correlation with the data 60. In selecting the hypothetical shale model, additional information may be considered, such as known information regarding the formation makeup.

Referring to FIG. 7, additional shale models (shown using RATO13 values) are illustrated representing the sandstone-illite model 74, 76, as well as additional shale models representing the sandstone-illite model including varying concentrations of trace elements. In this example, boron is selected as the trace element included in the sandstone-illite mix. The additional shale models include a water line 86 and a gas line 88 for the sandstone-illite mix including 100 ppm boron, a water line 90 and a gas line 92 for the sandstone-illite mix including 200 ppm boron, and a water line 94 and a gas line 96 for the sandstone-illite mix including 300 ppm boron. The measured data points 60 are compared with these models to determine the closest hypothetical model. The coherence between measured data and theoretical modeling results is significantly improved by introduction of trace absorber elements in the formation mix as evident in these figures.

In one embodiment, sigma values 98 for each of the pulsed neutron measurements are calculated and used to determine the appropriate trace element concentration to be used in the shale model. The sigma values 98 are analyzed, for example, based on known sigma values for selected elements. In this example, as shown in FIG. 8, the sigma values 98 are analyzed and the formation sigma is estimated at approximately 40 capture units (cu). In this instance, it is known that the formation sigma for a 50% pure-quartz sandstone, 50% clay mix is 11-12 cu, and that the formation sigma increases gradually as the boron concentration increases. Based on this knowledge, and knowledge of the formation (based on previous shale models and/or other measurements), the concentration of boron in this example is determined to be about 300 ppm. Thus, the model 94, 96 is selected as the shale model.

Referring to FIG. 9, a number of hypothetical matrix models are shown. In this example, the hypothetical matrix models include a water line 100 and a gas line 102 for pure sandstone, a water line 104 and a gas line 106 for sandstone including 100 ppm of boron, and a water line 108 and a gas line 110 for sandstone including 200 ppm of boron. Similarly as above, the data 60 is processed to determine the closest hypothetical model.

For example, it can be seen that the pure sandstone model 100, 102 does not coincide with any measured data points 60, and thus the formation should be estimated to have an elevated matrix capture cross section. Models of matrix and/or sand containing boron can be used, for example, to illustrate higher capture cross section formations. The 100 ppm Boron sandstone model 104, 106 does coincide with some data points 60 and encompasses the greatest number of data points in combination with the shale model 94, 96. Thus, in this example, the model 104, 106 is selected as the matrix model.

As shown in FIG. 10, in one embodiment, additional properties of the formation are incorporated into the selected matrix and shale models. The additional properties can be determined based on known information, pulsed neutron measurements and/or other borehole measurements. In this example, the salinity of water and oil and gas density in the matrix and the shale is incorporated in each model. For instance, the matrix model water line 104 is adjusted based on a 100 kilo parts-per-million (kppm) salinity to produce an adjusted water line 112. In addition, the shale model water line 94 is adjusted based on a 54 kppm salinity to produce an adjusted water line 114.

Additional properties also include oil density, which may be known based on pre-existing data. For example, an oil line 116 for the matrix model is shown, and an oil line 118 for the shale model is shown.

FIG. 11 is another illustration of the selected matrix and shale models, forming the final formation models. The formation model may be used to estimate properties such as saturation and bulk volume. For example, the formation model is used to shift or otherwise modify the pulsed neutron data (e.g., RIN13 and RATO13 data) to produce capture analysis data reflecting the amount of gas, oil, water or other constituencies. An example of the capture analysis data using the formation model of FIG. 11 is shown in FIG. 13, which includes water, oil and gas lines and is discussed in more detail below.

In one embodiment, saturation such as oil or gas saturation is estimated by producing interpretation plots based on the capture analysis data. An exemplary interpretation plot showing estimated oil saturation is shown in FIG. 13, which is discussed in more detail below.

The apparatuses and methods described herein have various advantages over prior art apparatuses and techniques. The apparatuses and methods allow for the generation of improved models, which result in more accurate estimations of formation properties and reduce the complexity of formation property calculations. For example, the models described herein reflect total porosity and a more detailed characterization of shale, allowing for more accurate estimates of dry and wet values. The models are advantageous over prior art models in that the total porosity includes porosity effects of shaly regions, such as the effect of clay bound water.

Furthermore, the apparatuses and methods described herein simplify analysis by eliminating the need for a dry shale calibration point or detailed mineralogy and clay composition that is not readily available from log data. In addition, the apparatuses and methods simplify the analysis in that they only require a linear shift to reconcile the measured and modeled data, in contrast to prior art analyses that require linear and non linear terms.

Some advantages of the apparatuses and methods described herein are illustrated by the comparison of well log analysis data according to the methods described herein with prior art well log analysis data. FIGS. 12 and 13 illustrate a comparison between well log analysis data produced using the models described herein and analysis data produced using prior art models.

FIG. 12 shows a prior art well log 120 including gamma ray data 122 for a cased wellbore. The prior art well log 120 includes oil saturation data 124, and capture analysis data 134 including relative concentrations of gas, water and oil shown by gas line 126, wet line 128 and oil line 130. The prior art well log 120 shows a relatively weak correlation between the oil saturation data 124 and reference open hole data 132, which is based on open hole measurements of the same wellbore. In addition, the capture analysis data 134 shows little differentiation between relative concentrations of water, gas and oil, as shown by the water line 128, the gas line 126 and the oil line 130.

FIG. 13 shows an exemplary well log 140 including analysis data generated according to the apparatuses and methods described herein. The well log includes the gamma ray data 122, which is the same as that used for the prior art well log 120. Oil saturation data 142 clearly is more closely correlated to the reference open hole data 132 than the prior art oil saturation data 124. In addition, capture analysis data of the well log 140 shows a much clearer differentiation between the water line 144, the gas line 146 and the oil line 148, and accordingly provides a much more accurate picture than the prior art models.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. A method of estimating at least one property of an earth formation, comprising:
    receiving measured pulse neutron data generated by a carrier disposed in the formation wherein a neutron source disposed at the carrier configured to irradiate the formation with neutrons, wherein measuring radiation emitted by the formation in response to irradiation of the formation with neutrons, is measured by at least one gamma ray detector;
    constructing by a processor in communication with the at least one gamma ray detector, a predictive matrix model of a formation, the predictive matrix model including an expected measurement response to a selected amount of a matrix material, wherein constructing includes generating a plurality of hypothetical matrix models, each hypothetical matrix model having a different amount of a matrix material, comparing the plurality of hypothetical matrix models to the measured pulsed neutron data, and selecting a hypothetical matrix model that most closely correlates with the measured pulsed neutron data;
    constructing by the processor a separate predictive shale model of the formation, the predictive shale model including an expected measurement response to a selected amount of a shale material and an estimation of a concentration of at least one trace element, wherein constructing the predictive shale model includes generating a plurality of hypothetical shale models, each hypothetical shale model having a different mixture of at least one shale material, subsequently comparing the plurality of hypothetical shale models to the measured pulsed neutron data, and selecting a hypothetical shale model that most closely correlates with the measured pulsed neutron data;
    combining, by the processor, the first model and the second model to generate a formation model; and
    comparing measured pulsed neutron data with the mixed model to estimate the at least one property.

2. The method of claim 1, wherein the predictive matrix model and the predictive shale model include expected pulsed neutron measurement data and a total porosity of the formation.

3. The method of claim 1, further comprising estimating the concentration of the at least one trace element based on sigma values derived from the measured pulsed neutron data.

4. The method of claim 1, wherein the at least one trace element is selected from at least one of boron, gadolinium and samarium.

5. The method of claim 1, wherein the at least one property is at least one of a hydrocarbon saturation and a water saturation.

6. The method of claim 1, further comprising generating the pulsed neutron data by a pulsed neutron tool disposed in a borehole in the earth formation.

7. The method of claim 1, wherein the matrix model includes a selected amount of a sand material, and the shale model includes a selected mixture of a sand material and the shale material.

8. The method of claim 1, wherein each hypothetical matrix model has a different concentration of at least one trace element.

9. The method of claim 8, wherein each of the plurality of hypothetical matrix models includes selected concentrations of sand material, clay material and at least one trace mineral.

10. The method of claim 9, wherein the sand material includes at least one of sandstone, limestone and dolomite.

11. The method of claim 1, wherein the plurality of hypothetical matrix models and the plurality of hypothetical shale models each include expected pulsed neutron measurement data at a selected depth, plotted against total porosity values.

12. The method of claim 11, further comprising adjusting the selected hypothetical shale model based on a concentration of the at least one trace element, the concentration of the at least one trace element based on sigma values derived from the measured pulsed neutron data.

13. An apparatus for estimating at least one property of an earth formation, comprising:
    a carrier configured to be disposed in the formation;
    a neutron source disposed at the carrier and configured to irradiate the formation with neutrons;
    at least one detector disposed at the carrier and configured to measure gamma rays emitted by the formation and generate gamma ray measurement data; and
    a processor in communication with the at least one detector to receive the gamma ray measurement data, the processor configured to:
    construct a predictive matrix model of a formation, the predictive matrix model including an expected measurement response to a selected amount of a matrix material, the predictive matrix model constructed by generating a plurality of hypothetical matrix models, each hypothetical matrix model having a different amount of a matrix material, comparing the plurality of hypothetical matrix models to the measured pulsed neutron data, and selecting a hypothetical matrix model that most closely correlates with the measured pulsed neutron data;
    construct a separate predictive shale model of the formation, the predictive shale model including an expected measurement response to a selected amount of a shale material and an estimation of a concentration of at least one trace element, the predictive shale model constructed by generating a plurality of hypothetical shale models, each hypothetical shale model having a different mixture of at least one shale material, subsequently comparing the plurality of hypothetical shale models to the measured pulsed neutron data, and selecting a hypothetical shale model that most closely correlates with the measured pulsed neutron data;

combine the matrix model and the shale model to generate a formation model; and compare the gamma ray measurement data with the formation model to estimate the at least one property.

14. The apparatus of claim 13, wherein the predictive matrix model and the predictive shale model include expected gamma ray measurement data and a total porosity of the formation.

15. The apparatus of claim 13, wherein the processor is configured to estimate the concentration of the at least one trace element based on sigma values derived from the gamma ray measurement data.

16. The apparatus of claim 13, wherein the at least one detector includes a first detector located at a first distance from the neutron source and a second detector located at a second distance from the neutron source, the second distance being greater than the first distance.

17. The apparatus of claim 13, wherein the carrier is configured to be disposed in a borehole in the earth formation.

18. The apparatus of claim 17, wherein the matrix model includes a selected amount of a sand material, and the shale model includes a selected mixture of a sand material and the shale material.

19. The apparatus of claim 13, wherein each hypothetical matrix model has a different concentration of at least one trace element.

20. The apparatus of claim 13, wherein the plurality of hypothetical matrix models and the plurality of hypothetical shale models each include expected pulsed neutron measurement data at a selected depth, plotted against total porosity values.

* * * * *